Patented Feb. 21, 1950

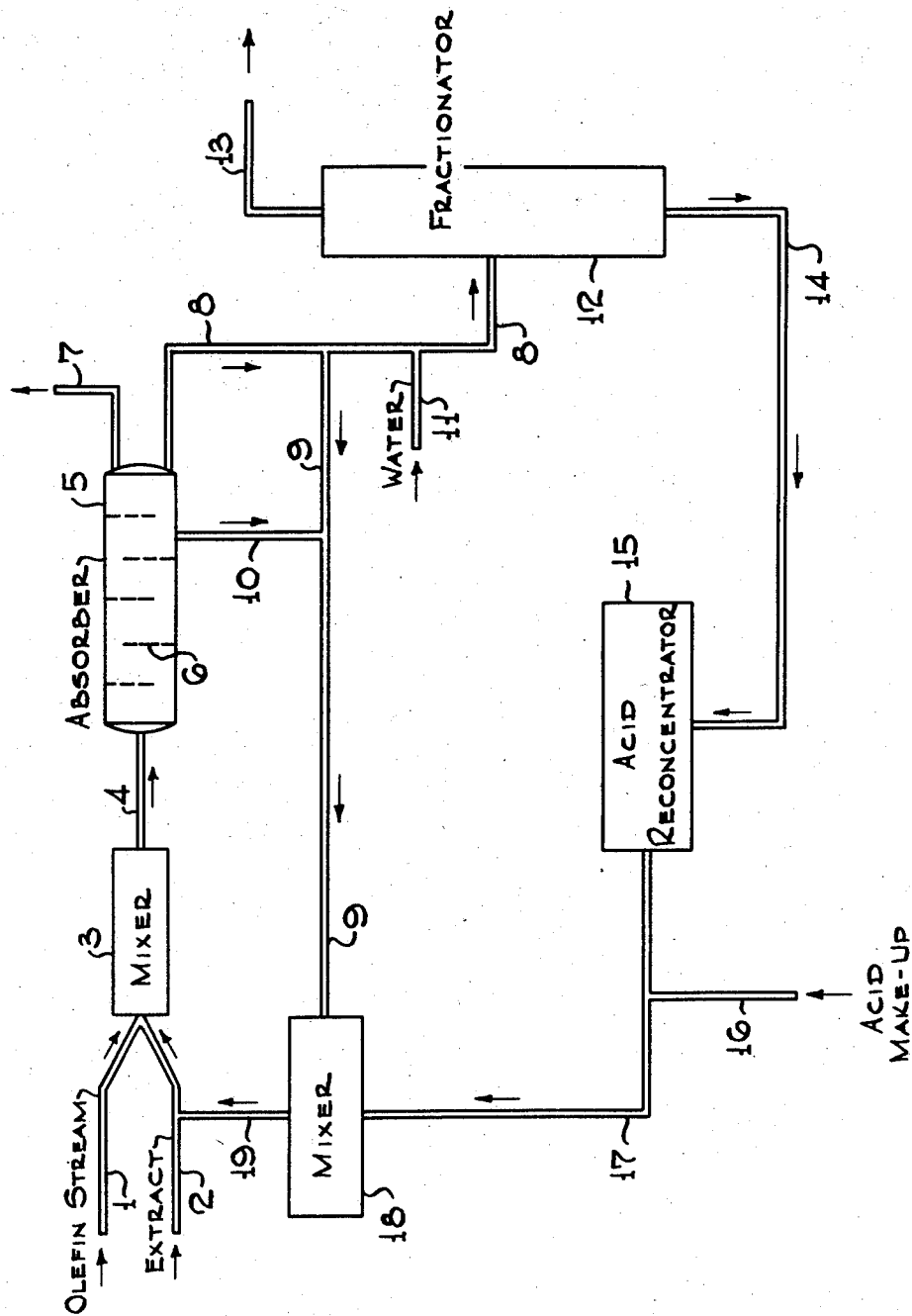

2,497,959

UNITED STATES PATENT OFFICE 2,497,959

ALCOHOL PROCESS

Richard F. Robey, Cranford, and Salvatore G. Gallo, Roselle, N. J., assignors to Standard Oil Development Company, a corporation of Delaware Application June 7, 1947, Serial No. 753,346

15 Claims. (Cl. 260—639)

The present invention relates to an improved process for the production of aliphatic alcohols from olefinic hydrocarbons, and more particularly to a process wherein the polymerization of tertiary olefins and the copolymerization of tertiary olefins with normal olefins are strongly suppressed during the manufacture of secondary aliphatic alcohols. This permits correspondingly increased yields of secondary alcohols and the recovery of tertiary alcohol and/or tertiary olefins as such and as may be desired.

The production of aliphatic monohydric alcohols through the absorption of olefinic hydrocarbons in mineral acids such as sulfuric acid using the cracked gases from a petroleum oil refinery as the source of aliphatic olefins to form an acid extract which is subsequently hydrolyzed and distilled to recover the alcohol, is a widely used process. Generally speaking, cracked gases, produced by thermal, catalytic or steam cracking of hydrocarbon oils, are a heterogeneous mixture of saturated hydrocarbons, normal olefins, tertiary olefins, some hydrogen and smaller quantities or traces of other unsaturated hydrocarbons such as diolefins and acetylenes. For the purpose of this invention, the tertiary olefins are best described as those mono- or diolefins which have in the molecule a double bonded carbon atom attached to three other carbon atoms. Thus, the four valences of a tertiary carbon atom are occupied by three other carbon atoms.

The first step toward economic utilization of cracked refinery gases is the separation of the gases by close fractionation into isomerous groups or fractions in which substantially all of the hydrocarbons present have the same number of carbon atoms. The next step in the refinery process, according to the present best practice, is the separation of the various hydrocarbons within an isomerous group. This is accomplished by methods relying upon a marked difference in the reactivity of the various hydrocarbons. The diolefins, acetylenes and other hydrocarbons of higher unsaturation than monoolefins may be first removed by reaction with copper salts or other known means. Of the major constituents present in the isomerous group it is known that the tertiary mono-olefins are the most reactive to sulfuric acid; next come the normal mono-olefins. The saturated hydrocarbons are inert for all practical purposes. For instance, isobutylene is removed from a mixture of hydrocarbons containing isobutylene and normal butenes by reacting the mixture with sulfuric acid of 60–65% acid strength on a hydrocarbon-free basis, or with other strong acids of equivalent strength, under conditions such that little if any of the normal butenes react, or an amylene fraction may be contacted with 65–75% sulfuric acid or with 80–85% benzenesulfonic acid to remove the tertiary amylenes. However, the sulfuric acid method for separating tertiary olefins from normal olefins may leave varying quantities of tertiary olefins behind with these normal olefins. The preliminary removal of tertiary olefins represents an added expense and, in many instances, it is preferably avoided if the tertiary olefin concentration of the feed is not too high. In practice, the tertiary olefin present in such a fraction is usually 2–25% of the total hydrocarbon. When such fractions are mixed with fresh or lean acid of sufficient strength, e. g. 83–92% $H_2SO_4$ under ordinary conditions, i.e. 0°–30° C. preferably 25° C. and atmospheric pressure or higher, to react with the normal olefin to give an acid extract, large amounts of polymer are formed due to the polymerization of the tertiary olefins and copolymerization of the tertiary olefins with normal olefins. Alternatively, the fraction may be brought into prior contact with sulfuric acid of 60–70% concentration or with phosphoric acid at elevated temperatures to remove the tertiary olefins by copolymerization with the normal olefins, before being brought into contact with 83–92% acid. However, little normal olefin remains to be converted to alcohol.

Recently processes have been developed, e. g. steam cracking of petroleum fractions in which hydrocarbons are cracked at temperatures in the neighborhood of 1200° F. in the presence of steam. This process produces cracked products containing a higher percentage of olefin, averaging 80–95% total olefin as compared to 30–50%, found in the cracked gases produced by former cracking processes. In the fractions obtained from steam cracked gases which contain isomerous groups of olefins, it has been found that from 10–25% of the total hydrocarbons are tertiary olefins. Products containing a high percentage of olefins suitable for extraction by the process of this invention have been also produced by the synthesis of hydrocarbons by reaction of hydrogen and carbon oxides in the presence of catalysts, particularly iron catalysts. The olefin products resulting from the process in the presence of the iron catalyst have been found to contain the proper ratio of tertiary to normal olefins as is required for the extraction described in this invention. Some fractions, particularly the $C_5$ fraction, containing say 50–70% normal olefins and 15–25% tertiary olefins, respectively, are not amenable to the method of removing the tertiary olefins by contact with H₂SO₄ of 60–65% concentration. In hydrocarbon mixtures of such high concentration of normal and tertiary olefins, the weak acid method removes only about 50% of the tertiary olefins present. This is objectionable because it leaves too high a percentage of tertiary olefin in the hydrocarbon causing polymerization and copolymerization in the subsequent alcohol process as previously described. The use of hot weak acid converts the tertiary olefin to polymers which remain in solution in the hydrocarbon and, in addition, consume large amounts of the valuable olefins to produce products other than the desired alcohol. Unless the hydrocarbon is redistilled to remove the polymers, they are carried over into the alcohol process where, in contact with the stronger acid of the alcohol process, they enter into further polymerization and copolymerization reactions causing loss in alcohol yield.

The principal object of the present invention is to provide a process for producing alcohols from the normal olefins of cracked petroleum products which shall materially reduce the loss of olefins due to polymerization. This and other objects of the present invention will be apparent to those skilled in the art upon reading the following description.

It has now been found that diolefin-free hydrocarbon feed mixtures to an alcohol process, consisting predominantly of an isomerous group of olefins of which not more than 25% is tertiary olefin, need not be pretreated to remove tertiary olefin if the hydrocarbon mixture is contacted with the reaction product of a normal olefin of the type present in the hydrocarbon feed (or its equivalent in alcohol) and strong acid of a concentration adapted to sulfating olefins, i. e. 82–92% for butenes and 75–85% for amylenes and higher olefins, on a hydrocarbon-free basis, in which the ratio of olefin to acid on a molar basis is at least 1:1, and preferably 1.2:1 for C₅ and higher olefins. In other words, instead of contacting the olefin-hydrocarbon stream with lean acid, the olefin hydrocarbon stream is contacted with an acid extract of at least unit saturation, i. e. an extract prepared by absorbing one mol of olefin (or alcohol) in one mol of acid. In this manner it is seen that the olefin stream never contacts lean acid.

According to our invention therefore, the ratio of normal olefin to tertiary olefin in the hydrocarbon feed to the extraction process must be greater than approximately 2.5:1. For example, if the feed contains olefins in the percentages of 71% normal olefin and 29% tertiary olefin (a ratio of 2.44:1) the polymerization of the tertiary olefins is not as greatly inhibited as at a higher ratio, 80% normal olefin and 20% tertiary, e. g. 4:1. Likewise, if the percentage of total olefin is not great enough, i. e. below about 65%, again the polymerization of the tertiary olefin is not as greatly inhibited because of the excessive times of residence required for the extraction reaction to be economically completed.

Secondly, according to our invention it is essential that the above-described olefin stream, i. e. an olefin stream containing normal and tertiary olefins in which the ratio of normal olefin to tertiary olefin lies above approximately 2.5 to 1 be contacted with an olefin-acid extract or an alcohol-acid extract of at least unit saturation, i. e. an extract prepared by absorbing 1 mol of olefin (or alcohol) in 1 mol of acid, i. e. a ratio of 1:1. And furthermore, for olefins of 5 carbon atoms and higher (e. g. amylene, hexylenes, etc.) it is preferred to employ an olefin-acid extract or olefin-alcohol extract of saturation of at least about 1.2, that is, a ratio of olefin to acid or alcohol to acid of about 1.2 to 1.

The highly olefinic product from the steam cracking of gas oil is a convenient source of olefinic feed fractions containing at least 70% isomerous olefins. In practice the product obtained by steam cracking gas oil is subjected to close fractionation to separate the product into several fractions, each fraction containing hydrocarbons having substantially the same number of carbon atoms. Starting with the C₄ fraction and continuing to the higher molecular weight fraction, it will be found that these fractions are composed predominantly (at least 70%) of an isomerous group of normal and tertiary olefins is at least about 2.5:1. Under certain conditions of steam cracking, it is possible to produce a cracked product from which a fraction containing almost 100% unsaturated hydrocarbons can be recovered.

According to the present invention an olefinic feed stock of at least 70% isomerous mono-olefins, of which not more than about 25% based upon total olefin, are tertiary olefins, is contacted under conditions conducive to olefin absorption with an acid extract composed of a strong acid of a concentration (on a hydrocarbon-free basis) best adapted to absorb the normal olefin being fed at the prevailing conditions, in which there is already dissolved at least 1 mol of normal olefin of the type being fed per mol of H₂SO₄.

To initiate the process of this invention the acid extract used may be obtained from an extraneous source such as a prior absorption. The hydrocarbon feed may be also brought into contact with a continuously recycled extract stream, passing the mixture through a reaction zone, recycling a portion of the extract from this zone and treating the remainder to recover desired products. Also the acid extract may be made up from a secondary alcohol and acid, in which case, sufficient alcohol and acid of proper concentration are mixed together to produce an extract of at least unit saturation or in other words an extract containing at least 1 mol of olefin (or alcohol) per mol of acid. Where hydrocarbons of 5 or more carbon atoms to the molecule are being absorbed, it is preferred to use an acid extract of at least 1.2 saturation. The process of the present invention may be run either batch or continuously. The olefins are absorbed in the extract at a temperature between 0–30° C., preferably about 25° C. at atmospheric pressure although higher pressures may be used if desired.

Prior to chemical reaction of olefins in strong acids to form extracts, it can be shown that the olefinic hydrocarbon physically dissolves to a greater or lesser extent in the acid solution depending on the saturation. Rather considerable amounts of olefins dissolve physically at the higher saturations above unity. With amounts of olefin exceeding this solubility it is sometimes found that they emulsify from the action of emulsification agents of its own making. Alternatively, to hasten the rate of solution and to maintain homogeneity, an emulsifying agent may be intentionally added. Such a surface active agent is represented by the sulfonated compounds. The sulfonated compounds found to be effective in bringing about emulsification or foaming in the reaction zone are the oil-soluble sulfonates obtained in the preparation of white oils by treating lubricating oil distillates of average molecular weight of about 300 with strong sulfuric acid, crude hydroxy octyl sulfonates, water-soluble sulfonates obtained from sulfuric-acid oil sludges, and various aromatic and aliphatic sulfonates such as castor oil sulfonates or sulfonic acids, e. g. turkey red oil. These sulfonates or other surface active agents are added in amounts between 1% and 5% preferably between 0.5 and 2.0% by volume based on the extract.

Briefly, our invention consists in feeding an olefin stream of the type already described into an extract of at least unit saturation (containing an emulsifying agent if necessary) in such a manner that a solution, a stiff emulsion or a foam is produced and an ultimate extract saturation of about 1.40 to 1.70 mols of olefin per mol of acid is produced. An emulsion or foam will be formed if the olefin stream is fed through a perforated plate or into an extract subjected to continuous agitation, or into an extract contained in a vessel provided with baffle mechanisms. The emulsion of the extract after reaching a saturation of about 1.40 to 1.70 is then processed during which it is diluted and distilled to recover secondary and tertiary alcohols and/or olefins as desired. Part of the extract of 1.40 to 1.70 saturation is returned to the olefin feed line where it meets fresh olefin and fresh or reconcentrated acid and is diluted to a saturation not below 1.0 (or not below 1.2 for C5 and higher olefins) and the process cycle begins again. With regard to the extract which is being converted to desired products it may be diluted with water to an acid strength of 50% or higher, calculated on a hydrocarbon-free basis, and the tertiary olefins and secondary alcohol recovered by stripping. If the extract is diluted with water to 35% or 40% dilution and steam stripped, the tertiary olefin is converted practically entirely to tertiary alcohol which mixes with the secondary alcohol and requires separate fractionation for separation. In such an operation, as described, it is seen that the tertiary olefin is recovered as the olefin or as tertiary alcohol and very little is converted to tertiary olefin polymer or tertiary olefin-normal olefin copolymer. Such an operation furthermore obviates the necessity of providing a costly step for removal of tertiary olefins from an olefin stream before employing the olefin stream in an alcohol production process of the olefin hydration type.

The example of the application of our invention may be best explained by reference to the accompanying drawing which is a "flow-sheet" or diagrammatic representation of the steps of our process in one of its modifications:

A hydrocarbon stream containing normal olefins and tertiary olefins in which the ratio of normal olefins to tertiary olefins is at least 2.5:1, is pumped through line 1 to mixer 3. Acid-olefin extract or acid-alcohol extract extraneously prepared and being of at least unit saturation, i. e. an extract prepared by absorbing 1 mol or olefin (or alcohol) in 1 mol of acid is also led through line 2 to mixer 3 wherein a homogeneous solution is formed. Addition of an emulsifying agent will aid in affecting solution. The homogeneous solution of olefin and extract is led via line 4 to an absorber or soaking vessel 5 provided with baffle elements 6. The homogeneous solution is allowed to stand or soak in the absorber 5 for sufficient time for the dissolved olefin to react with the extract whereby an ultimate extract saturation of about 1.40 to 1.70 is formed. Raffinate hydrocarbons and any polymers formed during the soaking operation may be removed from vessel 5 via line 7. The extract of 1.40 to 1.70 saturation is pumped from the absorber through line 8 to still 12 for recovery of useful alcohol and olefin products. Part of the extract of 1.40 to 1.70 saturation is withdrawn from line 8 through line 9 (or, alternatively, directly from the soaker via line 10 to line 9) and returned to mixer 18 as will be explained below. Before the extract withdrawn from the soaker via line 8 enters the still 12 it is diluted with water entering by pipe 11. The diluted extract enters the midpoint of still 12 and is countercurrently stripped with steam for the recovery of useful alcohol and olefin products withdrawn via line 13. These products may be separated, purified and stored by means well known in the art. The bottoms from still 12 consist chiefly of dilute acid. This dilute acid is withdrawn via line 14 to a conventional acid reconcentration zone 15 where it is converted back to the necessary strength, i. e. 82–92% for butenes absorption and 75–85% for amylenes absorption etc. Make-up acid entering the process via line 16 is added to the reconcentrated acid leaving the reconcentrator via line 17. The acid in line 17 then mixes with the 1.40 to 1.70 saturation extract withdrawn from the soaker system via line 9 in mixer 18 and reduces the saturation of the extract to a figure not below unit saturation (1.0) and preferably 1.2 for C5 olefins and higher. This extract of 1.0 or 1.2 saturation, as the case may be, then enters the absorption process via lines 19 and 2 to contact fresh hydrocarbon feed entering through line 1.

It will be seen from the description of the above process that the hydrocarbon stream consisting substantially of normal olefins and tertiary olefins in the ratio of above 2.5 to 1 is never allowed to contact fresh or lean acid. The fresh feed of the composition described is only allowed to contact an extract of at least unit saturation and in the case in which the feed consists of olefins of 5 carbon atoms or more the extract is preferably of at least 1.2 saturation. In this manner, the object of the invention is attained and the polymerization of the tertiary olefin, and/or copolymerization of the tertiary olefins with the normal olefins kept at a minimum.

The efficiency of our process in suppressing the polymerization reactions described, can be seen from the following examples which are not intended to limit our invention.

*Example I*

A sulphuric acid solution of mixed isomerous amylenes containing 0.7 mol of total amylenes per mol of sulfuric acid (80% strength on a hydrocarbon-free basis) was formed as previously described, that is, by acid extraction of amylenes or amyl alcohol followed by equilibration. To this extract of 0.7 mol saturation was added an amylene stream comprising 80% normal amylene and 20% tertiary amylene (4:1 ratio) and the mass mixed until the amylenes dissolved in the extract. Solution may be aided by the addition of an emulsifying agent as previously mentioned. The total amount of amylenes polymerized per hour at 25° C. during the extraction step amounted to 8.5% which is considered excessive. This indicates that polymerization of the t-amylene or copolymerization of the tertiary-normal amylenes is not suppressed when a stream of mixed amylenes comprising 80% normal amylenes and 20% tertiary amylenes is dissolved in an extract of only 0.7 saturation.

Example II

A sulfuric acid solution of mixed isomerous amylenes was formed as in Example I except that it was built up to a saturation of 1.0 instead of 0.7. An amylene stream of the same composition as in Example I, i. e. 80% normal 20% tertiary amylene, was dissolved in this 1.0 saturation extract. The total amylenes polymerized per hour at 25° C. amounted to 3.1%.

Example III

Another sulfuric acid extract was prepared as in Example I except that it was built up to a saturation of 1.4 mols of amylene or equivalent per mol of sulfuric acid. An amylene stream of the same composition (80%–20%) with respect to normal and tertiary amylenes was dissolved in the 1.4 saturation extract. The total amylenes polymerized per hour at 25° C. amounted to only 1.7% which is considered an insignificant amount.

Example IV

In this example, an amylene stream comprising 71% normal amylene and 29% tertiary amylene (ratio of 2.4:1) was dissolved in a sulfuric acid-amylene extract of 1.4 saturation. The total amylenes polymerized per hour at 25° C. amounted to 5.0%. This exemplifies the fact that if the percentage of tertiary olefins present in the olefin stream is too great, the polymerization is not as greatly inhibited.

In each of the above examples, after the removal of the polymer and raffinate hydrocarbons from the soaking or absorption step, the enriched extract was diluted with water and steam stripped to recover secondary alcohols and tertiary olefin or tertiary alcohol, depending upon the extent of the dilution of the extract.

Many modifications of our process will be apparent to those skilled in the art. The process may be carried out in batch, intermittent, or continuous operation. The process is adapted to be carried out by operating with the hydrocarbon olefin stream either in the vapor or liquid phase, and with or without the use of pressure.

It will be seen from the foregoing description that our process is capable of producing in a one-stage operation, secondary alcohol and tertiary alcohols or normal and tertiary monomeric olefins in improved yield by the very efficient removal of tertiary base olefins in the hydrocarbon stream without their substantial polymerization.

By the term strong acid, as used in the specification and claims, we mean an acid such as sulfuric acid, phosphoric acid, benzenesulfonic acid, its homologs and the like.

By the term isomerous as used in this specification with reference to the mixture of hydrocarbons, we means a mixture of hydrocarbons containing the same number of carbon atoms per molecule.

It is to be understood that our invention is not to be limited by the foregoing description of the preferred embodiment of our invention either in the details of operation or in the theory whereby the advantageous results are said to be attained. Our invention we regard to be limited only by the appended claims in which it is our intention to claim all novelty as broadly as possible in view of the prior art.

We claim:
1. A process of producing a strong acid liquor extract by the absorption of an isomerous mono-olefinic hydrocarbon mixture containing predominantly normal olefins and tertiary base olefins in a strong acid without substantial polymerization of the tertiary base olefins which comprises adjusting the ratio of normal olefins to tertiary base olefins present in the isomerous mono-olefinic hydrocarbon mixture to a ratio of 2.5 to 10:1 and contacting the hydrocarbon mixture containing olefins in said ratio with a strong acid extract of at least unit saturation prepared by absorbing the equivalent of at least one mol of isomerous normal mono-olefin per mol of acid.

2. A process according to claim 1 in which the strong acid is sulfuric acid.

3. A process according to claim 1 in which the isomerous mono-olefinic hydrocarbon mixture consists of hydrocarbons containing from 4 to 8 carbon atoms, and in which the acid is sulfuric acid.

4. A process according to claim 1 in which the hydrocarbon mixture containing olefins is contacted with an acid extract in the presence of an emulsifying agent.

5. A process for the selective removal of tertiary base mono-olefins from an isomerous mono-olefinic hydrocarbon mixture containing predominantly normal and tertiary isomerous mono-olefins in the ratio of 2.5 to 10:1 without substantial polymerization of the tertiary base olefins which comprises forming a strong acid liquor in which the mol ratio of isomerous normal mono-olefin to acid is at least 1.0, contacting the acid liquor with the isomerous mono-olefinic mixture whereby an enriched extract of both normal and tertiary olefins is formed, hydrolyzing the enriched extract, and removing tertiary base component from the hydrolyzed extract.

6. A process according to claim 5 in which the acid is sulfuric acid.

7. A process according to claim 5 in which the isomerous mono-olefinic hydrocarbon mixture consists of hydrocarbons containing from 4 to 8 carbon atoms, and in which the acid is sulfuric acid.

8. A process according to claim 5 in which the enriched extract is formed with the aid of an emulsifying agent.

9. A continuous process for the production of a secondary aliphatic alcohol and a tertiary base aliphatic component from a hydrocarbon mixture containing predominantly isomerous mono-olefins of 4 to 8 carbon atoms in which the ratio of isomerous normal olefins to tertiary olefins is 2.5 to 10:1, which comprises contacting the hydrocarbon mixture with an acid extract of the isomerous normal mono-olefin hydrocarbon in which the mol ratio of isomerous normal mono-olefin to acid is at least 1.0 in an absorption zone whereby an enriched extract containing both absorbed normal and tertiary isomerous mono-olefin is formed and whereby substantial polymerization of the tertiary mono-olefin is avoided, hydrolyzing a portion of the enriched extract, and recovering secondary aliphatic alcohol and the tertiary base aliphatic component, contacting the remainder of the enriched extract with acid whereby the enriched extract is reduced to a mol ratio of olefin to acid not below 1.0, and returning said extract to contact said isomerous mono-olefin hydrocarbon mixture in the absorption zone.

10. A process according to claim 9 in which secondary amyl alcohol and tertiary amylene are produced from a hydrocarbon mixture containing isomerous normal amylenes and tertiary amylenes, and in which the acid is sulfuric acid.

11. A process according to claim 9 in which secondary amyl alcohol and tertiary amyl alcohol are produced from a hydrocarbon mixture containing isomerous normal amylene and tertiary amylenes, and in which the acid is sulfuric acid.

12. A continuous process for the production of a mixture of isomerous aliphatic alcohols of 4 to 8 carbon atoms which comprises contacting a hydrocarbon mixture containing predominantly isomerous mono-olefins of 4 to 8 carbon atoms in which the ratio of isomerous normal olefins to tertiary olefins is 2.5 to 10:1 with a strong acid extract of the isomerous normal mono-olefinic hydrocarbon in which the mol ratio of isomerous normal mono-olefin to acid is at least 1.0 whereby an enriched extract containing both absorbed normal and tertiary isomerous mono-olefins is formed, and whereby substantial polymerization of the tertiary olefin is avoided, hydrolyzing a portion of the enriched extract and recovering a mixture of isomerous aliphatic alcohols, contacting the remainder of the enriched extract with acid whereby the enriched extract is reduced to a mol ratio of olefin to acid not below 1.0 and returning said extract to contact said isomerous mono-olefin hydrocarbon mixture.

13. A process according to claim 12 in which a mixture of isomerous amyl alcohols is produced from a hydrocarbon mixture containing isomerous normal and tertiary amylenes, and in which the acid is sulfuric acid.

14. A process according to claim 12 in which a mixture of isomerous butyl alcohols is produced from a hydrocarbon mixture containing isomerous normal and tertiary butylenes, and in which the acid is sulfuric acid.

15. A continuous process for the production of a mixture of isomerous aliphatic alcohols containing 4 to 8 carbon atoms which comprises contacting a hydrocarbon mixture containing isomerous mono-olefins of 4 to 8 carbon atoms in which the ratio of normal olefins to tertiary olefins is 2.5 to 10:1 with a strong acid extract of the isomerous normal mono-olefinic hydrocarbon in which the mol ratio of isomerous normal mono-olefin to acid is at least 1.0 whereby an enriched extract containing both absorbed normal and tertiary isomerous olefins is formed, and whereby substantial polymerization of the tertiary olefins is avoided, hydrolyzing part of the enriched extract to recover a mixture of isomerous aliphatic alcohols and spent dilute acid, reconcentrating and fortifying the spent dilute acid, contacting the remainder of the enriched extract with the reconcentrated and fortified acid until the enriched extract is reduced to a saturation not below 1.0 and returning said extract to contact the said isomerous mono-olefin hydrocarbon mixture.

RICHARD F. ROBEY.
SALVATORE G. GALLO.

REFERENCES CITED

The following references are of record in the file of this patent:

UNITED STATES PATENTS

| Number | Name | Date |
|---|---|---|
| 2,006,942 | Clark | July 2, 1935 |
| 2,015,105 | Dreyfus | Sept. 24, 1935 |
| 2,042,212 | Deanesly | May 26, 1936 |
| 2,414,737 | Heinrich | Jan. 21, 1947 |
| 2,428,119 | Ludeman | Sept. 30, 1947 |